May 16, 1972      L. RINGDAL      3,663,680

METHOD OF MOULDING SHAPED ARTICLES WITH HOLLOW WALLS

Filed Sept. 30, 1969

INVENTOR.

LARS RINGDAL

United States Patent Office 3,663,680
Patented May 16, 1972

3,663,680
METHOD OF MOULDING SHAPED ARTICLES WITH HOLLOW WALLS
Lars Ringdal, Montebelloveien 15, Oslo 3, Norway
Filed Sept. 30, 1969, Ser. No. 862,170
Int. Cl. B29c 5/04
U.S. Cl. 264—294
6 Claims

ABSTRACT OF THE DISCLOSURE

The method disclosed is one in which a hollow-walled article, such as a boat, is formed by sintering plastic material in a mould to form substantially spaced inner and outer walls having the desired thickness and thereafter moving the walls relatively toward each other to form connections at desired points while the plastic material is still hot, soft and adhesive so that completely firm and solid connections are formed.

---

This invention relates to a method for manufacturing double-walled objects of plastic. As examples of such objects may be mentioned boats, bath tubs and the like. In the case of boats, the double walls are particularly advantageous when the hollows between the walls are closed inasmuch as the boat is thus sinkproof. In this description a boat has been taken as an example, and it is manufactured by sintering plastic material in a mould, the moulding surfaces of which form the outside and inside of the hull respectively. The mould is rotated about two axes in order to achieve a correct distribution of the plastic material which is to be sintered together to form the required wall thickness, and, in order to acquire sufficient strength and rigidity the two walls lie so closely spaced at certain points, that the space between them becomes filled with plastic material forming a connection between the walls.

The prior production of such interconnections by allowing the walls of the mould, at certain places, to lie so closely spaced that the material, during the sintering process, builds a bridge between the outer and inner wall of the object, has, in practice, proved a very unsatisfactory solution, in that material of the wall at these points will contain air bubbles and become spongy so that instead of the reinforcement intended, the result is a weak point in the object. It is difficult to form any opinion as to the cause of this, but part of this unfortunate effect is perhaps due to the fact that the plastic material is virtually unable to move once the interconnection has been formed.

The object of the present invention therefore is primarily to arrive at a method which makes it possible to produce the desired, and often necessary, interconnections between the two walls, whereby the connections are formed by homogenous, solid material. According to the invention this is achieved in that the two walls of the object are formed by sinter moulding, in the manner known per se, but at such a great distance from one another that the above mentioned connections between the walls are not formed whilst the wall thickness is being built up. After the walls have been formed on the surfaces of the mould, these are brought together in such a manner that the layers of plastic material, which form the said walls, are brought into contact with one another at raised projecting points where interconnection between the walls is required. In this way, one insures that the material in the interconnections is of exactly the same quality as the remainder of the walls of the object.

This invention thus relates to a method for manufacturing double-walled plastic objects, in which the walls are formed by sintering a plastic material in a mould which is rotated about at least two axes and in which the two walls at certain points are to be interconnected, and it is primarily characterized in that the walls are formed at such a great distance from one another that connections do not occur and, when they are finish-formed they are brought together in such a manner that the interconnections are formed at the points mentioned.

In carrying out the improved method one may employ a mould and support for rotation of the mould about at least two axes, for example, as disclosed in the applicant's Patent No. 3,202,745. In accordance with the improved method the inside of the mould is designed to be coated with plastic by sintering in thicknesses corresponding to the wall thickness of the finished product, with raised parts and protrusions in that point or those points where connections are to be formed between the walls, and it is characterized in that that part of the mould where the one wall is formed, may be moved relative to that part of the mould where the other wall is formed, in that the parts of the mould are held at their greatest distance from one another whilst the walls are being formed, and are brought closer together after the walls have been formed but while they are still plastic so that the said interconnections are formed.

In order that the invention may be more readily understood, it will be described below quite briefly with reference to the drawings, in which.

Figure 1:
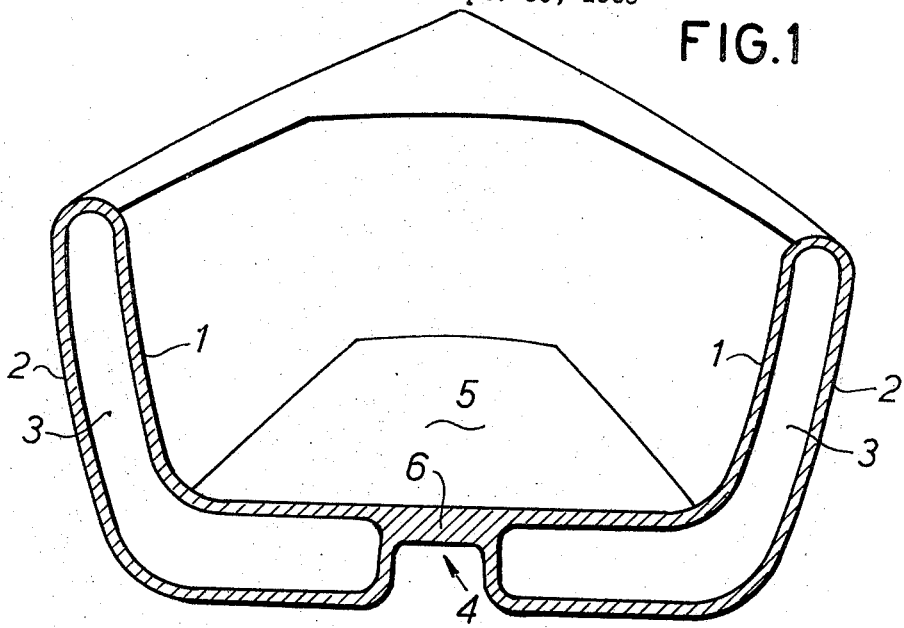
FIG. 1 shows a section through a boat manufactured by sinter moulding.

In FIG. 1, a section is shown through the front part of a small vessel. This has an inner wall 1 and an outer wall 2 which lie at a distance from one another and enclose a hollow 3. In the bottom, the vessel has, on the outside, a longitudinal channel 4 which gives the vessel good directional stability in the water and furthermore strengthens the bottom quite considerably. The internal bottom 5 is, in the example shown, also connected to the material forming the channel 4, in such a manner that, in the region at 6 the material is solid and homogenous, and there is good connection between the outer and inner walls.

Figure 2:
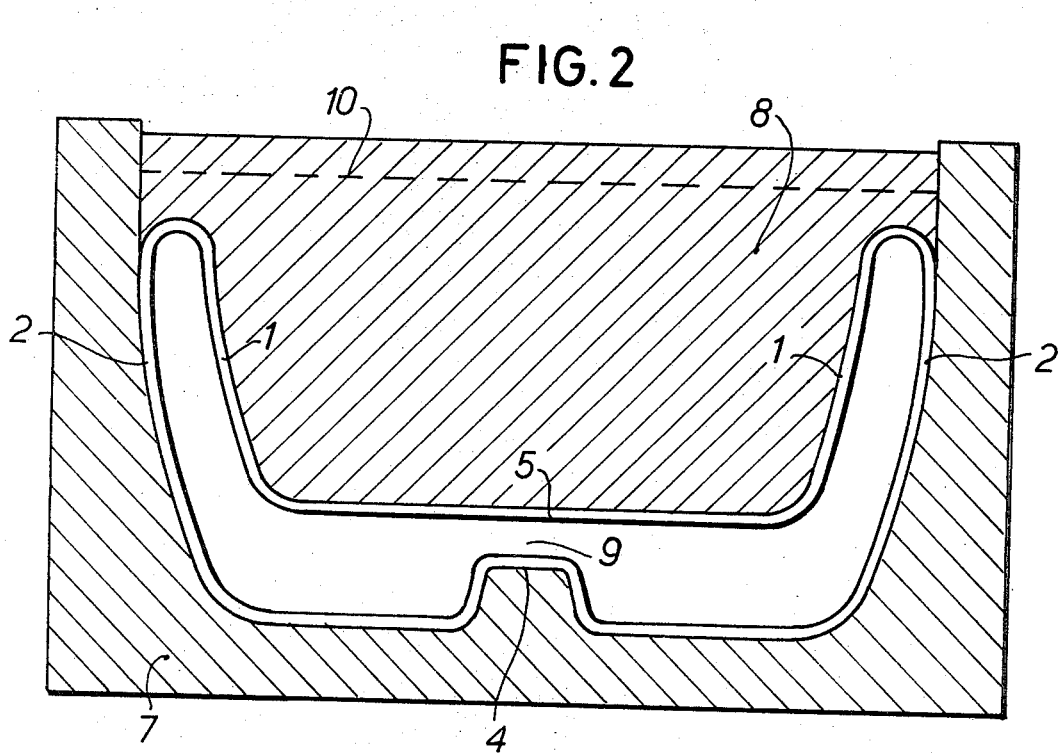
FIG. 2 shows, in purely diagram form, a section through a means for carrying out the process.

The vessel is manufactured in a mould as indicated at 7, 8 in FIG. 2, and the walls 1 and 2 of the vessel are built up by sintering plastic material together. The mould is heated and rotated about two axes by means not shown, and as the heated mould rotates about at least two axes (not shown) a uniform wall thickness is obtained. The mould, as shown in FIG. 2, consists of two parts 7 and 8 and during the building up of the walls 1 and 2, and also the bottom with channel 4 and internal bottom 5, parts 7 and 8 are at such a good distance from one another that the plastic material does not form any bridge in the region between the bottom 5 and the channel 4. The mould part 7, as shown in FIG. 2, includes a central inwardly projecting ridge or ribs which forms the channel 4 in the wall 2 during the moulding operation. During rotation, the plastic material has therefore a good opportunity of being distributed correctly and uniformly so that the walls 1 and 2 acquire the correct thickness. There will thus be no reason why the material of the walls in the region at 9 in FIG. 2, should be any different from the material in the other portions of the walls.

After the material has been spread out in the mould 7, 8, and the walls 1 and 2 have been formed, part 8 of the mould is brought down relative to part 7 of the mould until its upper surface is at the position of the dotted line 10 in FIG. 2. In this way the bottom 5 and the wall 2 at the channel 4 are brought together in the region at 9, and as the plastic material is still hot, soft and adhesive, a completely firm and solid connection is formed here as indicated at 6 in FIG. 1. That connected upper portions of the walls 1 and 2 the are thus pressed somewhat together offers the further advantage that the gunwale (not shown) of the vessel becomes somewhat thickened and thus stronger.

The example shown and described serves merely to illustrate the invention and forms no limitation to the protection, since other embodiments can well be envisaged which would fall within the scope of the invention, for example the rigid connection between the two walls of the object can be produced at points where the walls are brought together after they have been formed on the inside of the mould used.

Having described my invention, I claim:

1. The method of moulding a shaped article of plastic material having spaced apart double walls joined by a solid interconnection at a predetremined region, the method comprising the moulding of plastic material for making the article in a mould having spaced cavity wall surfaces on which the spaced apart double walls of the article are to be respectively formed, the moulding operation including the steps of rotating the mould about at least two axes, distributing the plastic material in the mould cavity and covering the inside surfaces of the walls thereof to the desired thickness, heating the plastic material in the mould and sintering it on the spaced walls of the mould to form the spaced apart double plastic walls, and bringing said spaced apart plastic walls together and in contact with each other at the location of said region while the plastic material thereof is adhesive, and forming a firm solid interconnection between the plastic walls at the location of said region.

2. The method of moulding as claimed in claim 1, wherein the article comprises a vessel having inner and outer bottom walls, moulding the lower portion of the outer bottom wall with a region projecting from the inner portion of the outer bottom wall toward the inner bottom wall, and bringing the inner bottom wall and the projecting region together to form said firm interconnection.

3. The method of moulding as claimed in claim 2, the step of simultaneously forming the projecting region of the outer bottom wall and an exterior channel in said outer bottom wall.

4. The method of moulding as claimed in claim 3, wherein the vessel is a water-borne vessel and simultaneously forming the projecting region of the outer bottom wall and the exterior channel lengthwise of the vessel.

5. The method of moulding as claimed in claim 1, wherein the article is a boat-type vessel having spaced apart double inner and outer side walls and spaced double bottom walls, and wherein the mould comprises outer and inner parts, and reducing the height of the side walls as initially formed while bringing the plastic bottom walls together and in contact with each other at the location of said region by moving one of said mould parts toward the other.

6. The method of moulding as claimed in claim 5, wherein the region in which the said bottom walls are brought together is located centrally of the inner and outer bottom walls of the vessel.

References Cited
UNITED STATES PATENTS

| | | | |
|---|---|---|---|
| 3,202,745 | 8/1965 | Ringdal | 264—310 |
| 3,372,820 | 3/1968 | Barnett | 264—310 |
| 3,391,823 | 7/1968 | Tijms | 264—311 |

ROBERT F. WHITE, Primary Examiner

J. R. HALL, Assistant Examiner

U.S. Cl. X.R.

264—310

UNITED STATES PATENT OFFICE
CERTIFICATE OF CORRECTION

Patent No. 3,663,680     Dated May 16, 1972

Inventor(s) Lars Ringdal

It is certified that error appears in the above-identified patent and that said Letters Patent are hereby corrected as shown below:

Column 4, line 13 (Claim 5, line 3), after "spaced"

insert --apart--.

Signed and sealed this 3rd day of October 1972.

(SEAL)
Attest:

EDWARD M. FLETCHER, JR.
Attesting Officer

ROBERT GOTTSCHALK
Commissioner of Patents